United States Patent [19]

Baker

[11] 4,272,374
[45] Jun. 9, 1981

[54] APPARATUS FOR TREATING WASTEWATER

[76] Inventor: William E. Baker, 6706 Markwood St., Worthington, Ohio 43085

[21] Appl. No.: 63,435

[22] Filed: Aug. 3, 1979

[51] Int. Cl.³ .............................................. C02F 3/28
[52] U.S. Cl. ................... 210/180; 210/182; 210/195.1; 210/520
[58] Field of Search ......... 210/5, 6, 14, 520, 180–182, 210/195.1, 195.3, 218, 257.1

[56] References Cited

U.S. PATENT DOCUMENTS

| | | | |
|---|---|---|---|
| 2,029,702 | 2/1936 | Buswell et al. | 210/2 |
| 2,190,598 | 2/1940 | Fischer | 210/5 |
| 2,359,004 | 9/1944 | Schlenz et al. | 210/2 |
| 2,394,413 | 2/1946 | Walker | 210/8 |
| 2,458,163 | 1/1949 | Hays | 210/2 |
| 2,716,086 | 8/1955 | Schmidt et al. | 210/520 X |
| 2,798,041 | 7/1957 | Thompson et al. | 210/8 |
| 2,850,449 | 9/1958 | Torpey | 210/10 |
| 3,186,939 | 6/1965 | Murray | 210/7 |
| 3,226,317 | 12/1965 | Albertson | 210/6 |
| 3,259,566 | 7/1966 | Torpey | 210/14 X |
| 3,459,639 | 8/1969 | Bedker | 210/180 X |
| 4,067,801 | 1/1978 | Ishida et al. | 210/180 X |

*Primary Examiner*—Thomas G. Wyse
*Attorney, Agent, or Firm*—Sidney W. Millard

[57] ABSTRACT

Apparatus for treating wastewater includes a settling tank, a sludge digester and a holding tank. Solids from the settling tank are delivered uniformly throughout the seed sludge in the digester and combustible gas is drawn off the top. Sludge from the digester is delivered to the holding tank where further combustible gas evolves and is removed for other uses. The sludge from the holding tank is recycled through the digester or discharged from the system for drying and/or subsequent use.

6 Claims, 1 Drawing Figure

APPARATUS FOR TREATING WASTEWATER

BACKGROUND OF THE INVENTION

This invention relates to anaerobic treatment of wastewater. For purposes of this invention the term "wastewater" includes organic municipal, industrial or commercial waste.

Conventional systems for treating wastewater employ a settling tank to assist in separating the liquid from the solids. After a satisfactory holding time in the settling tank, sludge from the bottom portion is withdrawn and delivered to a digester where anaerobic microorganisms perform their known chemical decomposition.

Anaerobic digestion of organic solids is accomplished by two major groups of anaerobic microorganisms. The first group (facultative bacteria) liquefies and converts the complex structures of the organic sludge particles primarily into volatile organic acids (acetic, proprionic, butyric) with the release of carbon dioxide, water and some nitrogen sulfite. The second group of bacteria (methane formers) transforms the volatile organic acids into cell structures, stable degradation products, methane gas and carbon dioxide.

The methane forming bacteria are fragile as to temperature changes and pH. Where the sludge is allowed to cool or heat outside the temperature range in which the methane forming bacteria can survive, they will die. Similarly, where the volatile acids generated by the first phase of the digestion process become too concentrated, the methane forming bacteria will also die. Ether deviation will result in a halt in the desired process. Without good distribution or effective auxiliary stirring of the incoming feed sludge, the feed sludge is pumped into a point mass, thus, seriously overloading the bacterial food supply in that part of the digesting sludge, resulting in a preponderance of voltatile acid formation and an inhibition or total cessation of the methane phase of the digestion process. The absence of the methane stage, whether it be from temperature or pH change, results in an unstabilized sludge and the lost production of methane which is a valuable fuel gas. Thorough mixing of the incoming feed sludge with the mass of well diversified seeded digesting sludge is, therefore, of prime importance in producing methane and well stabilized sludge.

Some systems employ a heating system of the incoming sludge to maintain the proper temperature balance within the digester and various kinds of mixing apparatus have been employed. However, it has been discovered that vigorous agitation of the digesting sludge hydrolyzes and homogenizes the organic mass and liquid separation is inhibited.

Solids in the digestion tank or the settling tank are for the most part not greatly different in density than water itself and as a result, the gravitational separation of the solids from the liquid components takes considerable time. For example, in a settling tank complex, it may be several hours before the sludge will be sufficiently concentrated in the bottom of the tank to be withdrawn satisfactorily. It is no benefit to the system to withdraw large portions of liquid with the settled solids before delivering it to the digestion tank. It is intended that the liquid be separated by the gravitational process and be drawn off from the top of the settling tank for delivery elsewhere for subsequent treatment where necessary. Treatment of the liquid phase of the wastewater is not technically a part of this invention and conventional treating processes are to be employed with the liquid phase.

SUMMARY OF THE INVENTION

This invention employs a conventional settling tank from which sludge is withdrawn and heated before distribution to a digester. Special apparatus is employed to distribute the feed sludge uniformly throughout the digestion tank such that it is relatively, uniformly mixed into the seed sludge within the tank. The distribution system comprises a manifold centrally located in the digester with radially extending arms for delivery of the feed sludge to an area near the periphery of the digester. The manifold and radially extending arms slowly rotate as the feed sludge is discharged to evenly distribute the sludge and to slightly agitate the same. The sludge as distributed will slowly migrate downward and toward the center of the digester in a generally cone shaped pattern as sludge is withdrawn from the bottom of the digester. During the digestion process methane and other gases are generated within the digester and withdrawn for delivery elsewhere for reprocessing or use in some other system.

Sludge withdrawn from the bottom of the digester is delivered to a holding tank where additional gases result and further separation of the liquid and solid phases occurs. Such methane and other gases as are evolved in the holding tank are withdrawn and delivered elsewhere with the gas from the digester.

Some of the sludge from either or both the digester and the holding tank may be recycled to "seed" the feed sludge prior to its injection into the digester. Such sludge as is withdrawn from the holding tank, which is not recycled, is discharged from the system for drying and whatever ultimate use may be prescribed. For example, the resulting dry product may be deposited on farm land to serve as soil enrichment.

BRIEF DESCRIPTION OF THE DRAWING

The drawing shows the schematic representation of the apparatus involved in this invention in the sequential operation.

DESCRIPTION OF THE PREFERRED EMBODIMENT

Figure 1:
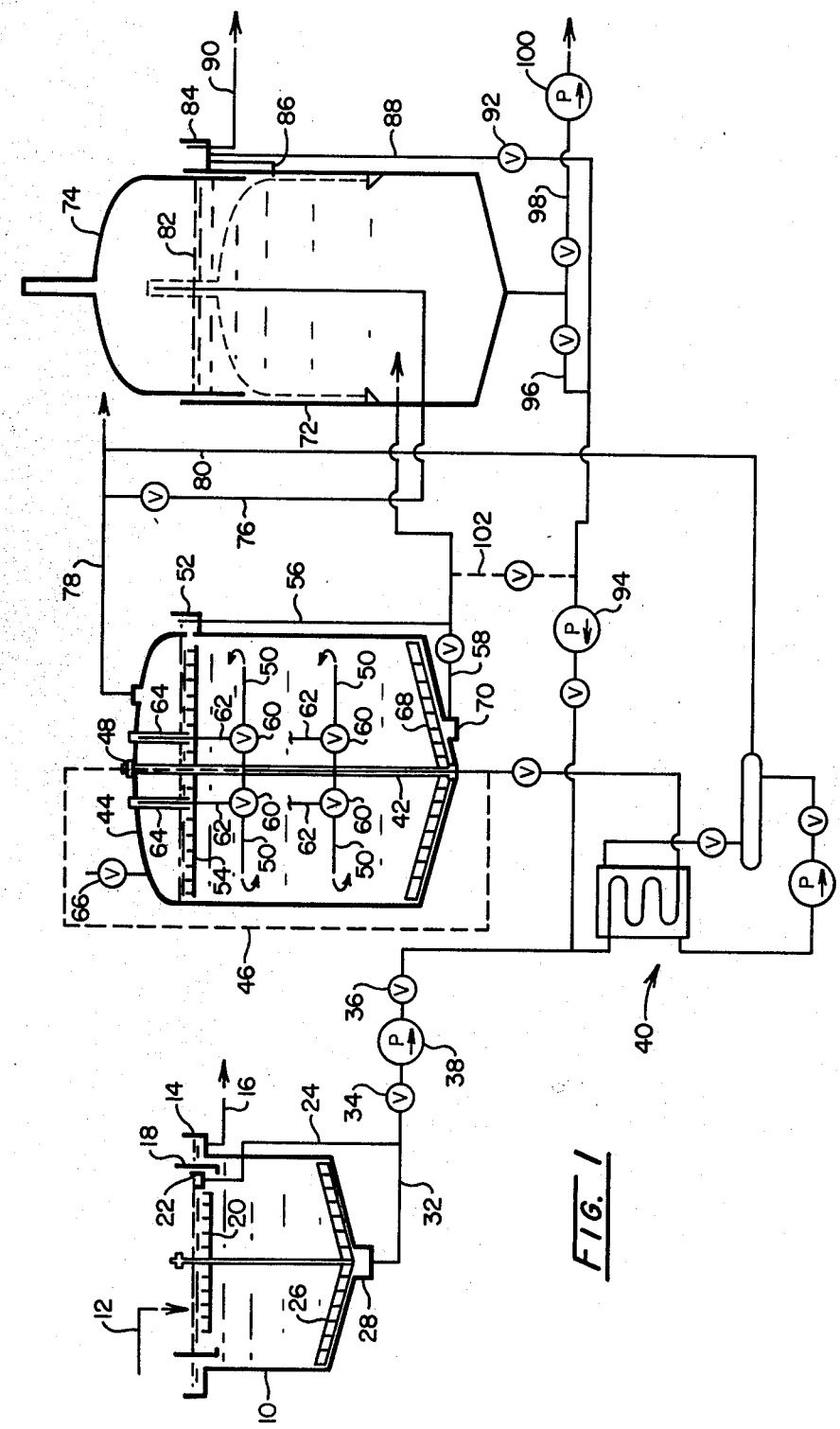

In municipal wastewater treatment systems it is conventional to have certain prior treatment of the wastewater and it will include a settling tank 10 which will be supplied by a feed line 12. For purposes of this invention the settling tank and feed line are to be considered to encompass all additional prior treatment which may be applied to the wastewater. It is understood that a series or plurality of settling tanks may be a part of the prior treatment.

The wastewater sludge is delivered to the settling tank and after a quiescent period, the solids which are heavier than water settle to the bottom. Additionally, solids and scum which are lighter than water will float to the top. There is a provision for decanting liquids to overflow through channel 14 and the effluent flows out of channel 14 through pipe 16. Pipe 16 leads out of the system and conducts the effluent elsewhere for further treatment by conventional methods where such is necessary.

To get to channel 14 the liquid component of the wastewater must flow under annular baffle 18 while the scum and floating solids are trapped in the tank by the baffle. A collector 20 is mounted in the settling tank to collect the scum and other floating solids and deliver the same to channel 22 where it is discharged through pipe 24.

As indicated, wastewater delivered through feed 12 will be allowed to stand idly in settling tank 10 for a suitable period of time to allow the sludge solids to settle to the bottom. After a suitable settling period a scraper 26 will be activated to urge the solids toward the sludge hopper 28.

Sludge from hopper 28 is withdrawn through piping 32 upon the opening of valves 34 and 36 and the activation of pump 38.

Piping 32 delivers the sludge to a heater 40 which is shown schematically. From heater 40, the sludge is delivered to a manifold 42 concentrically located within a digester 44. An alternative piping system 46 is shown merely to indicate that whether the sludge is delivered from the bottom or the top is immaterial.

The manifold 42 is journalled in appropriate bearings at the bottom and top and is mounted to rotate upon the actuation of a motor 48. Motor 48 will be actuated only when sludge is being delivered to the digester for puposes of distributing the feed uniformly throughout the digester. The distribution is by means of radially extending arms 50 which may extend out to within about a foot of the periphery of the digester. Rotation by the motor 48 is intended to be very slow (about 1 r.p.m.) to avoid excess agitation which could effectively prevent the separation of solids and liquids within the digester. As with the settling tank, some liquid as well as the scum and floating solids will be decanted or withdrawn from channel 52 when additional sludge is delivered from the heater 40 or the scum breaker 54 delivers floating solids to the channel 52. While it is shown in the drawing that the discharge from channel 52 is conducted by ducting 56 to the piping 58 of the sludge withdrawn from the bottom of the tank, it is within the contemplation of this invention that the liquid portion may be delivered to the settling tank 10, discharge line 16 or the feed line 32.

It will be observed that valves 60 are incorporated into radially extending arms 50 and that the valve stems 62 extend upward into an annular channel 64. The valves rotate with the arms and the stems move in a circle within the channel 64. The purpose of the valves is to allow the closing of several arms in the distribution system when one arm becomes clogged and does not distribute the feed sludge. It is contemplated that the closing of all valves except one would result in the high pressure pump 38 blowing the plug out of that particular arm. After that occurs the valves would all be reopened and the system would continue to operate.

Note that the annular channel 64 extends downward below the surface of the liquid within the digester. This serves as a gas lock to prevent the escape of the gases evolved as a result of the digester process. A pressure relief valve 66 functions to prevent excess pressure build-up within the digester.

As will be observed, the manifold 42 and the scraper 68 are both mounted to operate simultaneously by the activation of motor 48. The scraper delivers sludge to hopper 70 where it is discharge through piping 58 and delivered to holding tank 72. No additional treatment or agitation of the sludge is intended in holding tank 72 but digestion will continue and gases will continue to evolve. The floating head 74, well known in the art, will float on the gases evolved. Duct work 76 conducts gas from the holding tank to the additional duct work 78 which discharges the gases evolved in digester 44. The gases may be delivered elsewhere for methanation and/or purification or, as shown by feed line 80, may be delivered directly to the heater 40 for supplying the combustible gas necessary to raise the temperature of the sludge from settling tank 10 to the appropriate temperature for optimum digestion (about 95° F.).

The liquid level 82 in the holding tank 72 is controlled by the placement of a control box 84 which is fed from inside the tank by a tube 86. Liquid flowing into control box 84 will be discharged either through line 88 or 90. The supernatant liquor as discharged by line 90 may be delivered to an elective purification treatment process or elsewhere as circumstances dictate. Alternatively, the supernatant liquor may be delivered back to the digester by the opening of valve 92 and the actuation of pump 94 which will deliver the liquid to line 32 where it will flow with the raw sludge through heater 40 and back to the digester 44. Sludge from the bottom of holding tank 72 may also be delivered through line 96 to pump 94 and through the same sequence back to the digester. Alternatively, the sludge may be delivered through line 98 to pump 100 to a drying station for subsequent treatment depending on the ultimate intended use of the digested sludge.

Dashed line 102 illustrates that sludge withdrawn from the digester may be recirculated through the heater 40 and back into the digester, should the seeding of the feed sludge from settling tank 10 be desirable.

The benefit achieved by this described method and apparatus for treating wastewater is the reduced time of residence in the digester and the reduced liquid content of the sludge withdrawn through line 98. Under conventional agitating and distributing systems within the digester, the usual residence time is 15 to 30 days at about 95° F. With this invention the maximum residence time is about 15 to 20 days at the same temperature. Additionally, the liquid content of the sludge withdrawn through line 98 is reduced because of the reduced agitation within the digester which results in less homogenization of the product delivered to holding tank 72. Accordingly, the separation of solids and liquids within holding tank 72 is facilitated and most of the liquids will be drawn off through lines 88 or 90.

Having thus described the invention, it will be clear to those having ordinary skill in the art that certain modifications may be made in the apparatus or process described without departing from the inventive concept. Thus, it is not intended that the words used nor the drawing illustrating the invention be limiting on the invention. Rather it is intended that limitations on the invention be only as set out in the appended claims.

I claim:

1. In the combination of apparatus for treating wastewater including a settling tank and means for delivering wastewater to the tank, the wastewater including solid and liquid components; means for separating the solid from the liquid components; a sludge digester containing sludge; means for moving the separated solid component from the tank to the digester; and means for heating the separated solid component prior to its delivery to the digester, means for distributing the solid component substantially uniformly throughout the sludge in said digester comprising a rotating manifold mounted concentrically within the digester, the manifold having distribution arms in communication with the manifold and extending outwardly therefrom toward the periphery of the digester and to within about a foot of said periphery, means for rotating the manifold at a speed not substantially greater than one rpm, said speed being less than a speed which would cause a homogenous mixture within said digester, means for activating the rotating means only when sludge is being delivered to the digester, a holding tank and means for removing sludge from the digester and depositing it in the holding tank, means for removing sludge from the holding tank and combining it with the solid component prior to the time it is heated, and means for removing combustible gas from both the digester and the holding tank.

2. The combination of claim 1 wherein the temperature of the interior of the digester is about 95° F.

3. The combination of claim 2 including valve means for closing each distribution arm individually.

4. The combination of claim 3 wherein said valve means includes stems extending to the exterior of the digester.

5. The combination of claim 1 including valve means for closing each distribution arm individually.

6. The combination of claim 5 wherein said valve means includes valve stems extending to the exterior of the digester.

* * * * *